United States Patent
Lin et al.

(10) Patent No.: US 10,264,281 B2
(45) Date of Patent: Apr. 16, 2019

(54) METHOD AND APPARATUS OF INTER-VIEW CANDIDATE DERIVATION IN 3D VIDEO CODING

(71) Applicant: HFI Innovation Inc., Zhubei, Hsinchu County (TW)

(72) Inventors: Jian-Liang Lin, Yilan County (TW); Yi-Wen Chen, Taichung (TW)

(73) Assignee: HFI Innovation Inc., Zhubei, Hsinchu County (TW)

( * ) Notice: Subject to any disclaimer, the term of this patent is extended or adjusted under 35 U.S.C. 154(b) by 673 days.

(21) Appl. No.: 14/406,531

(22) PCT Filed: Jul. 2, 2013

(86) PCT No.: PCT/CN2013/078631
§ 371 (c)(1),
(2) Date: Dec. 9, 2014

(87) PCT Pub. No.: WO2014/005503
PCT Pub. Date: Jan. 9, 2014

(65) Prior Publication Data
US 2015/0181229 A1 Jun. 25, 2015

Related U.S. Application Data

(60) Provisional application No. 61/667,242, filed on Jul. 2, 2012, provisional application No. 61/744,859, filed on Oct. 3, 2012.

(51) Int. Cl.
*H04N 19/597* (2014.01)
*H04N 19/176* (2014.01)
(Continued)

(52) U.S. Cl.
CPC ......... *H04N 19/597* (2014.11); *H04N 19/105* (2014.11); *H04N 19/159* (2014.11);
(Continued)

(58) Field of Classification Search
CPC .... H04N 19/31; H04N 19/105; H04N 19/159; H04N 19/597; H04N 19/52; H04N 19/521; H04N 19/176
(Continued)

(56) References Cited

U.S. PATENT DOCUMENTS

2010/0266042 A1* 10/2010 Koo ............... H04N 19/597
375/240.16
2012/0257678 A1* 10/2012 Zhou ............... H04N 19/52
375/240.16
(Continued)

FOREIGN PATENT DOCUMENTS

WO 2004114680 A1 12/2004
WO WO 2013/138621 9/2013
(Continued)

OTHER PUBLICATIONS

Lin, J.L., et al.; "3D-CE5.a related motion vector competition-based Skip/Direct mode with explicit signaling;" Joint Collaborative Team on 3D Video Coding Extension Development of ITU-T SG 16 WP 3 and ISO/IEC JTC 1/SC 29/WG 11; Jul. 2012; pp. 1-4.
(Continued)

*Primary Examiner* — Christopher S Kelley
*Assistant Examiner* — Matthew K Kwan
(74) *Attorney, Agent, or Firm* — Oblon, McClelland, Maier & Neustadt, L.L.P.

(57) ABSTRACT

A method and apparatus for three-dimensional video coding are disclosed. Embodiments according to the present invention apply the pruning process to one or more spatial candidates and at least one of the inter-view candidate and the temporal candidate to generate a retained candidate set. The pruning process removes any redundant candidate among one or more spatial candidates and at least one of the inter-view candidate and the temporal candidate. A Merge/
(Continued)

Skip candidate list is then generated, which includes the retained candidate set. In one embodiment, the temporal candidate is exempted from the pruning process. In another embodiment, the inter-view candidate is exempted from the pruning process. In other embodiments of the present invention, the pruning process is applied to the inter-view candidate and two or more spatial candidates. The pruning process compares the spatial candidates with the inter-view candidate.

5 Claims, 11 Drawing Sheets

(51) Int. Cl.
 *H04N 19/159* (2014.01)
 *H04N 19/105* (2014.01)
 *H04N 19/52* (2014.01)
 *H04N 19/513* (2014.01)
 *H04N 19/31* (2014.01)
(52) U.S. Cl.
 CPC ........... *H04N 19/176* (2014.11); *H04N 19/31* (2014.11); *H04N 19/52* (2014.11); *H04N 19/521* (2014.11)
(58) Field of Classification Search
 USPC .................................................. 375/240.02
 See application file for complete search history.

(56) References Cited

U.S. PATENT DOCUMENTS

| 2013/0188720 | A1* | 7/2013 | Wang | H04N 19/00684 |
| | | | | 375/240.16 |
| 2013/0242046 | A1* | 9/2013 | Zhang | H04N 13/0048 |
| | | | | 348/43 |

FOREIGN PATENT DOCUMENTS

| WO | WO 2013/184468 | 12/2013 |
| WO | WO 2013/188784 | 12/2013 |

OTHER PUBLICATIONS

McCann, K., et al.; "High Efficiency Video Coding (HEVC) Test Model (HM5) Test Model 5 Encoder Description;" Joint Collaborative Team on Video Coding of ITU-T SG16 WP3 and ISO/IEC JTC 1/SC 29/WG 11; Nov. 2011; pp. 1-45.
Schwarz, H., et al.; "Test Model under consideration for HEVC based 3D video coding v3.0;" International Organisation of Standardisation; Apr. 2012; pp. 1-46.
Sullivan, G.J., et al.; "Overview of the High Efficiency Video Coding (HEVC) Standard;" IEEE; 2011; pp. 1-19.
Lin, J.L., et al.; "3D-CE5.h related—Pruning process for inter-view candidate;" Joint Collaborative Team on 3D Video Coding Extension Development of ITU-T SG 16 WP 3 and ISO/IEC JTC 1/SC 29/WG 11; Jul. 2012; pp. 1-4.
Zhang, L., et al.; "3D-CE5.h related—Improved merge mode for inter-view predicted motion;" Joint Collaborative Team on 3D Video Coding Extension Development of ITU-T SG 16 WP 3 and ISO/IEC JTC 1/SC 29/WG 11; Jul. 2012; pp. 1-4.
Lin, J.L., et al.; "3D-CE5.a results on motion vector competition-based Skip/Direct mode with explicit signaling;" International Organisation of Standardisation; May 2012; pp. 1-5.
Hannuksela, M.M.; "Test Model for AVC based 3D video coding;" International Organisation of Standardisation; Mar. 2012; pp. 1-18.
Bartnik, C., et al.; "HEVC Extension for Multiview Video Coding and Multiview Video plus Depth Coding;" ITU-Telecommunications Standardization Sector Study Group; Video Coding Experts Group; Feb. 2012; pp. 1-42.
Wiegand, T., et al.; "D3 Working Draft 3 of High-Efficiency Video Coding;" Joint Collaborative Team on Video Coding of ITU-T SG16 WP3 and ISO/IEC JTC 1/SC 29/WG 11; Mar. 2011; pp. 1-31.
Takehara, H., et al.; "Non-CE9 Merge candidates pruning without TMVP;" Joint Collaborative Team on Video Coding of ITU-T SG16 WP3 and ISO/IEC JTC 1/SC 29/WG 11; Feb. 2012; pp. 1-6.
Sugio, T., et al.; "Modified derivation process on motion vector predictor and weighted prediction for HEVC multi-view extension;" Joint Collaborative Team on Video Coding of ITU-T SG16 WP3 and ISO/IEC JTC 1/SC 29/WG 11; May 2012; pp. 1-17.
Ryu, Seungchul et al. "Adaptive Competition for Motion Vector Prediction in Multi-View Video Coding." 3DTV Conference: The True Vision-Capture, Transmission and Display of 3D Video (3DTV-CON). May 18, 2011(May 18, 2011), pp. 1 to 4, ISSN: 2161-2021.

* cited by examiner

METHOD AND APPARATUS OF INTER-VIEW CANDIDATE DERIVATION IN 3D VIDEO CODING

CROSS REFERENCE TO RELATED APPLICATIONS

The present invention claims priority to U.S. Provisional Patent Application, Ser. No. 61/667,242, filed Jul. 2, 2012, entitled "Modification of the pruning process for interview candidate" and U.S. Provisional Patent Application, Ser. No. 61/744,859, filed Oct. 3, 2012, entitled "Improvement of the pruning process for inter-view candidate". These U.S. Provisional Patent Applications are hereby incorporated by reference in their entireties.

FIELD OF INVENTION

The present invention relates to three-dimensional video coding. In particular, the present invention relates to derivation of candidate list for 3D video coding in Inter or Merge/Skip mode.

BACKGROUND OF THE INVENTION

Three-dimensional (3D) television has been a technology trend in recent years that intends to bring viewers sensational viewing experience. Various technologies have been developed to enable 3D viewing. Among them, the multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth.

A straightforward approach may be to simply apply conventional video coding techniques to each single-view video sequence independently and disregard any correlation among different views. Such coding system would be very inefficient. In order to improve efficiency of multi-view video coding, typical multi-view video coding exploits inter-view redundancy. Therefore, most 3D Video Coding (3DVC) systems take into account of the correlation of video data associated with multiple views and depth maps. The standard development body, the Joint Video Team of the ITU-T Video Coding Experts Group (VCEG) and the ISO/IEC Moving Picture Experts Group (MPEG), extended H.264/MPEG-4 AVC to multi-view video coding (MVC) for stereo and multi-view videos.

The MVC adopts both temporal and spatial predictions to improve compression efficiency. During the development of MVC, some macroblock-level coding tools are proposed, including illumination compensation, adaptive reference filtering, motion skip mode, and view synthesis prediction. These coding tools are proposed to exploit the redundancy between multiple views. Illumination compensation is intended for compensating the illumination variations between different views. Adaptive reference filtering is intended to reduce the variations due to focus mismatch among the cameras. Motion skip mode allows the motion vectors in the current view to be inferred from the other views. View synthesis prediction is applied to predict a picture of the current view from other views.

In the MVC, however, the depth maps and camera parameters are not coded. In the recent standardization development of new generation 3D Video Coding (3DVC), the texture data, depth data, and camera parameters are all coded. For example, FIG. 1 illustrates generic prediction structure for 3D video coding, where a standard conforming video coder is used for the base-view video. The incoming 3D video data consists of images (110-0, 110-1, 110-2, . . . ) corresponding to multiple views. The images collected for each view form an image sequence for the corresponding view. Usually, the image sequence 110-0 corresponding to a base view (also called an independent view) is coded independently by a video coder 130-0 conforming to a video coding standard such as H.264/AVC or HEVC (High Efficiency Video Coding). The video coders (130-1, 130-2, . . . ) for image sequences associated with the dependent views (i.e., views 1, 2, . . . ) further utilize inter-view prediction in addition to temporal prediction. The inter-view predictions are indicated by the short-dashed lines in FIG. 1.

In order to support interactive applications, depth maps (120-0, 120-1, 120-2, . . . ) associated with a scene at respective views are also included in the video bitstream. In order to reduce data associated with the depth maps, the depth maps are compressed using depth map coder (140-0, 140-1, 140-2, . . . ) and the compressed depth map data is included in the bit stream as shown in FIG. 1. A multiplexer 150 is used to combine compressed data from image coders and depth map coders. The depth information can be used for synthesizing virtual views at selected intermediate viewpoints. An image corresponding to a selected view may be coded using inter-view prediction based on an image corresponding to another view. In this case, the image for the selected view is referred as dependent view.

In the reference software for HEVC based 3D video coding version 3.1 (HTM3.1), inter-view candidate is added as a motion vector (MV) or disparity vector (DV) candidate for Inter (i.e., Temporal), Merge and Skip mode in order to re-use previously coded motion information of adjacent views. In HTM3.1, the basic unit for compression, termed as coding unit (CU), is a 2N×2N square block. Each CU can be recursively split into four smaller CUs until a predefined minimum size is reached. Each CU contains one or more prediction units (PUs). In the 3DV-HTM, the inter-view candidate derivation process involves a pruning process, i.e., removing redundant candidates. The pruning process is only applied to the spatial candidates in Inter, Merge and Skip mode. The pruning process is applied to neither the temporal candidates nor the inter-view candidates. The Merge candidate derivation process is shown in FIG. 2.

As shown in FIG. 2, the pruning process involves a small number of parallel motion information comparisons between the spatial candidates. For example, spatial candidates 1-4 (211-214) are pruned to provide a reduced number of spatial candidate or candidates to the Merge candidate list (250) as shown in FIG. 2. The temporal and inter-view candidates are exempted from the pruning process in the Merge candidate derivation process. In other words, the inter-view candidate and the temporal candidate are always included in the pruned candidate list. The motion information of a spatial candidate is inserted into the Merge list depending on a specific condition on this spatial candidate. The pruning process always retains A1 (shown in FIG. 3) in the list if a motion vector is available for A1. The conditions for these spatial candidates to be excluded from the Merge candidate list are as follows (shown in FIG. 3):

B1: B1 has the same motion information as A1 (indicated by arrow 310)
B0: B0 has the same motion information as B1 (indicated by arrow 320)
A0: A0 has the same motion information as A1 (indicated by arrow 330)
B2: B2 has the same motion information as A1 (indicated by arrow 340) or has the same motion information as B1 (indicated by arrow 350). B2 is checked only if any of A1, B1, B0 or A0 is excluded from the Merge list.

The locations of the spatial neighboring blocks are shown in FIG. 3, where the spatial neighboring block set includes the location diagonally across from the lower-left corner of the current block (i.e., A0), the location next to the left-bottom side of the current block (i.e., A1), the location diagonally across from the upper-left corner of the current block (i.e., B2), the location diagonally across from the upper-right corner of the current block (i.e., B0), and the location next to the top-right side of the current block (i.e., B1). When the block designations (i.e., B0, B1, B2, A0 and A1) are mentioned above, the block designation may refer to the motion vector or motion vector predictor associated with the block for convenience. For example, "A1 is available" implies "the motion vector of A1 is available". In HTM 3.1, the candidate set for the Inter mode includes one inter-view predictor (candidate), two spatial predictors (candidates) and one temporal predictor (candidate):

1. Inter-view predictor (candidate),
2. $1^{st}$ spatial predictor (candidate),
3. $2^{nd}$ spatial predictor (candidate), and
4. Temporal predictor (candidate)

The two spatial candidates in HTM 3.1 correspond to A1 block next to the left-bottom side of the current block and block B1 next to the top-right side of the current block. The inter-view predictor (candidate) is the motion vector of the corresponding block in the inter-view picture or the disparity vector derived from the depth map. A temporal predictor (candidate) is derived from a block ($T_{BR}$ or $T_{CTR}$) located in a collocated picture. In HTM v3.1, only when the number of available inter-view and spatial predictors equals 2, the pruning process is applied to compare these two predictors and to remove the redundant one. The temporal predictor is exempted from the pruning process. After the pruning process, only the first three available predictors are included in the candidate set. If the number of available predictors is smaller than 3, the zero predictor (240) is inserted as shown in FIG. 2.

If the total number of candidates in the Merge candidate list is less than a list size (e.g., 5), one or more combined motion vector are added as additional candidates. The combined motion vector is generated from the pruned spatial candidates from pruning process 220 by using combined MVP 230. For example, a bi-predictive Merge candidate can be formed by combining a MV candidate pointing a reference picture in List 0 and another MV candidate pointing to a reference picture in List 1.

It is desirable to develop a pruning process on inter-view candidate, spatial candidates and temporal candidate that may lead to improved performance such as RD-rate or reduced computation time or memory storage.

As illustrated in the above discussion, the candidate set derivation process involves various spatial and temporal neighboring blocks. It is desirable to reduce the complexity of the candidate set derivation without noticeable impact on system performance.

SUMMARY OF THE INVENTION

A method and apparatus for three-dimensional video encoding or decoding are disclosed. Embodiments according to the present invention apply the pruning process to one or more spatial candidates and at least one of the inter-view candidate and the temporal candidate to generate a retained candidate set. The pruning process removes any redundant candidate among one or more spatial candidates and at least one of the inter-view candidate and the temporal candidate. A Merge/Skip candidate list is then generated, which includes the retained candidate set. In one embodiment, one or more spatial candidates and the inter-view candidate are processed by the pruning process, and the temporal candidate is exempted from the pruning process. In another embodiment, one or more spatial candidates and the temporal candidate are processed by the pruning process, and the inter-view candidate is exempted from the pruning process.

One aspect of the present invention addresses the pruning process. When the pruning process is applied to one or more spatial candidates and the inter-view candidate, the inter-view candidate is pruned from the candidate list if the inter-view candidate has the same motion information as one of said one or more spatial candidates. One of said one or more spatial candidates may correspond to the first available candidate of said one or more spatial candidates. One of said one or more spatial candidates may also correspond to A1 or B1 block of the neighboring block set. When the pruning process is applied to one or more spatial candidates and the temporal candidate, the temporal candidate is pruned from the candidate list if the temporal candidate has the same motion information as one of said one or more spatial candidates. Again, one of said one or more spatial candidates may correspond to the first available candidate of said one or more spatial candidates. Also, one of said one or more spatial candidates may correspond to A1 or B1 block of the neighboring block set. Instead of pruning inter-view or temporal candidate, spatial candidates may also be pruned. For example, A1 candidate can be pruned from the candidate list if the A1 candidate has the same motion information as the inter-view candidate or the temporal candidate. Similarly, B1 candidate is pruned from the candidate list if the B1 candidate has the same motion information as the inter-view candidate or the temporal candidate. The pruning process can be applied to the candidate set having the candidates in any order.

In other embodiments of the present invention, a pruning process is disclosed for 3D video coding in Inter, Merge or Skip mode. Spatial candidates associated with spatial neighboring blocks of the current block and an inter-view candidate for the current block are determined. The candidate can be a motion vector candidate or a disparity vector candidate. A pruning process is applied to a pruning candidate set to generate a retained candidate set; wherein the pruning candidate set comprises the inter-view candidate and at least two spatial candidates, and the pruning process removes any redundant candidate in the pruning candidate set. An Inter, Merge or Skip candidate list comprising the retained candidate set is then generated. Inter-view predictive encoding or decoding is applied to the to-be-processed data using the Inter, Merge or Skip candidate list when the to-be-processed data is coded or decoded in the Inter, Merge or Skip mode respectively. In one embodiment, the pruning candidate set corresponds to the inter-view candidate, a first spatial candidate, and a second spatial candidate, and the pruning process corresponds to one comparison between the inter-view candidate and the first spatial candidate, and another comparison between the inter-view candidate and the second spatial candidate. Furthermore, the first or second spatial candidate can be retained in the Inter, Merge or Skip candidate list for the Inter, Merge or Skip mode respectively only if the first or second spatial candidate is different from the inter-view candidate. In another embodiment, the pruning candidate set further comprises the temporal candidate.

DETAILED DESCRIPTION

Pruning process for Inter or Merge/Skip candidate list in a three-dimensional video encoding or decoding system is disclosed, where the pruning process is applied to spatial candidates and at least one of the inter-view candidate and the temporal candidate.

Figure 1:
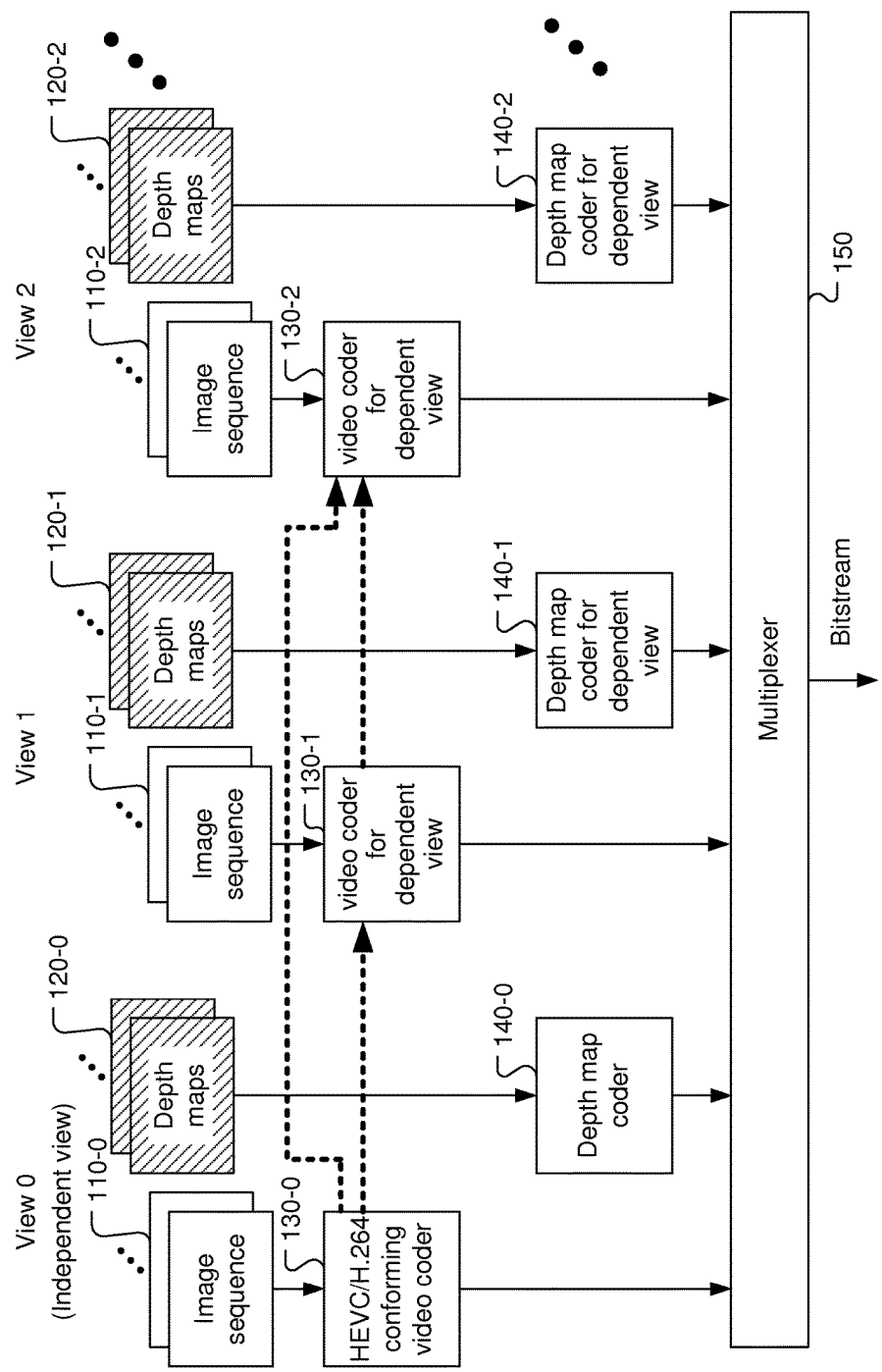
FIG. 1 illustrates an example of prediction structure for a three-dimensional video coding system.
Figure 2:
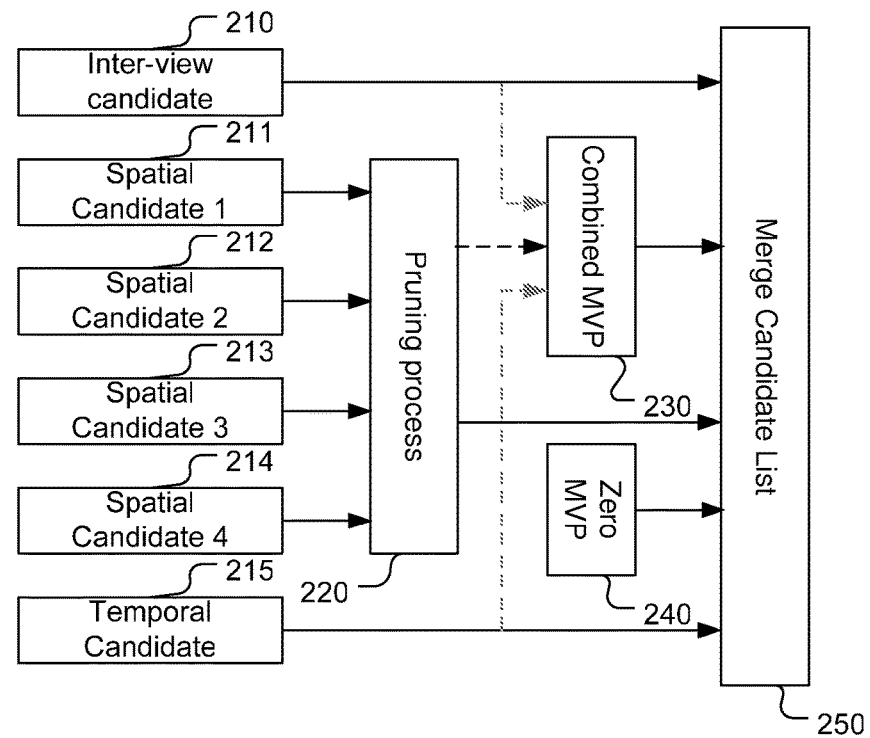
FIG. 2 illustrates an example of derivation process for Merge candidate list according to 3DV-HTM version 3.1.
Figure 3:
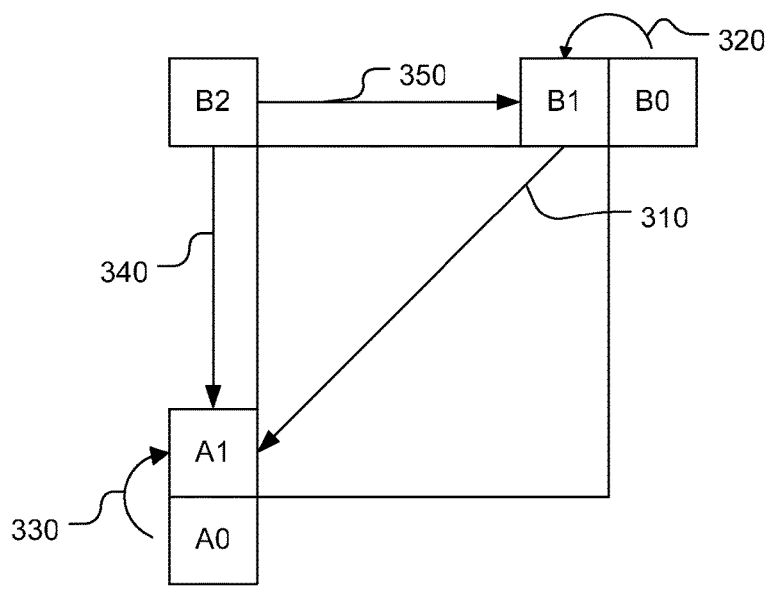
FIG. 3 illustrates an example of pruning process on spatial candidates for Merge candidate list according to 3DV-HTM version 3.1.
Figure 4:
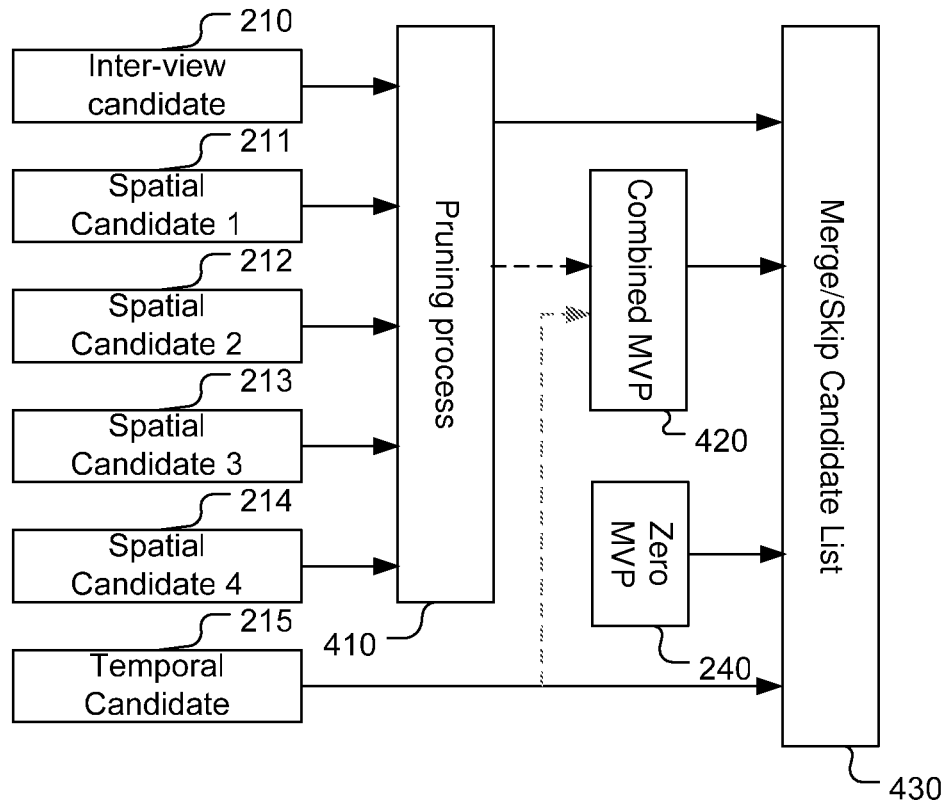
FIG. 4 illustrates an exemplary derivation process on spatial candidates and the inter-view candidate for Merge/Skip candidate list according to an embodiment of the present invention.
Figure 5:
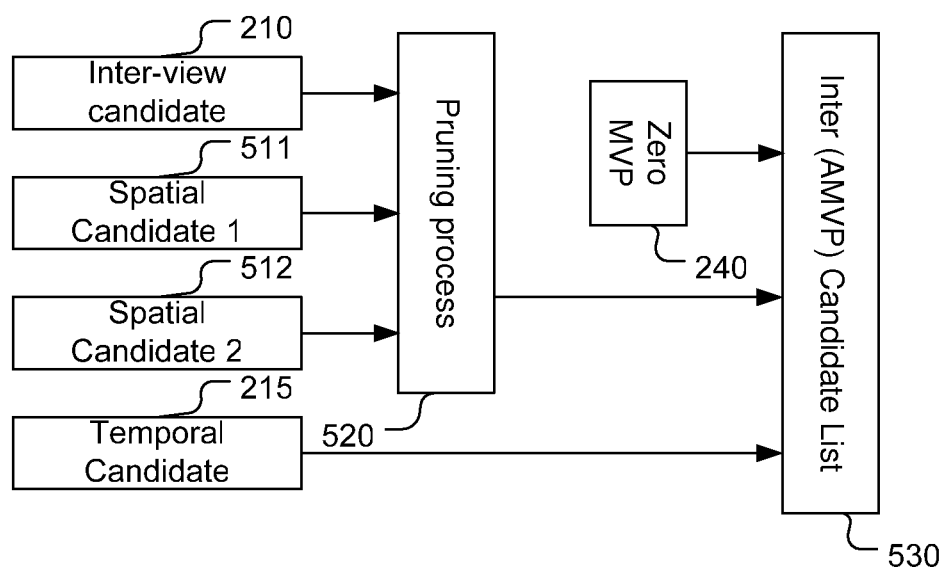
FIG. 5 illustrates an exemplary derivation process on spatial candidates and the inter-view candidate for Inter (AMVP) candidate list according to an embodiment of the present invention.

In the first embodiment, the pruning process is applied to the spatial and inter-view candidates for Inter, Merge and Skip mode. The temporal candidate is exempted from the pruning process. FIG. 4 illustrates an exemplary Merge/Skip candidate derivation process for Merge/Skip mode, where inter-view candidate 210 and spatial candidates 1-4 (211-214) are provided to pruning process 410. The retained candidates (i.e., the candidates not removed by the pruning process) from pruning process 410 along with the temporal candidate (215) are included in Merge/Skip candidate list 430. If the list size of the Merge/Skip candidate list 430 is smaller than a threshold, a combined Merge/Skip candidate can be added using combined MVP 420. Combined MVP 420 uses retained candidates from pruning process 410 and temporal candidate 215 to form one or more bi-predictive Merge/Skip candidates. If the number of Merge/Skip candidates is less than a threshold (e.g. 3), a zero MVP (240) can be included in Merge/Skip candidate list 430. FIG. 5 shows an exemplary Inter candidate derivation process for Inter mode, where pruning process 520 is applied to inter-view candidate 210, first spatial candidate 511 and second spatial candidate 512. Retained candidates from pruning process 520 are then included in Inter candidate list 530 along with temporal candidate 215. Again, if the number of the candidate is below a threshold, a zero MVP (240) is included in Inter candidate list 530. The Inter mode may correspond to the advanced motion vector prediction (AMVP) method known for high efficient video coding (HEVC) in the field. The candidate may correspond to a motion vector or a disparity vector in this disclosure.

Figure 6:
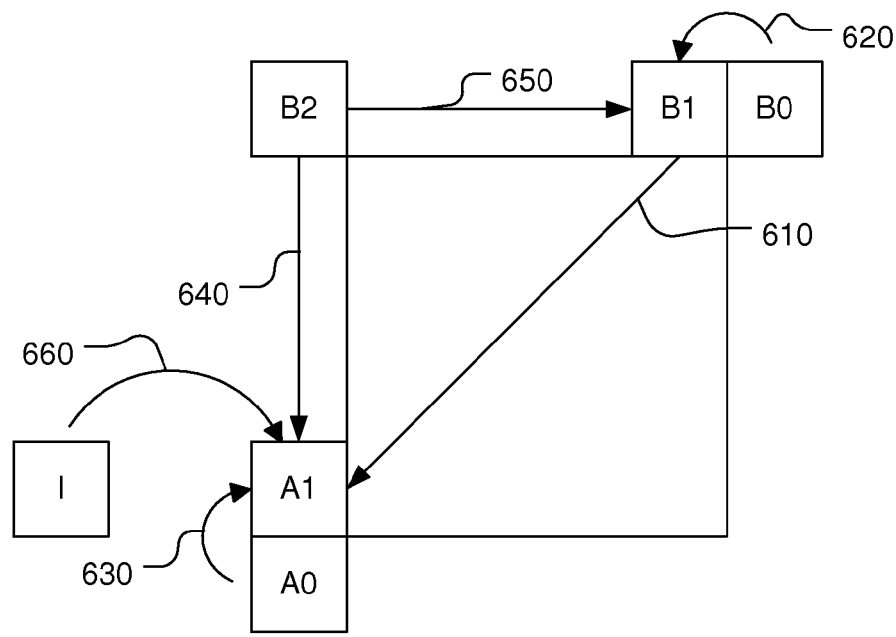
FIG. 6-FIG. 8 illustrates examples of derivation process for Inter or Merge/Skip candidate list according to an embodiment of the present invention.

In the second embodiment, the pruning process for Inter, Merge and Skip mode performs a small number of parallel motion information comparisons between candidates from the spatial candidates and the inter-view candidate. The temporal candidate is exempted from the pruning process. The motion information of a spatial or inter-view candidate is inserted into the Merge/Skip candidate list depending of a specific condition on this spatial or inter-view candidate. The pruning process always retains A1 in the list if motion information (e.g. a motion vector or a disparity vector) is available for A1. The conditions for the spatial and inter-view candidates to be excluded from the Inter or Merge/Skip candidate list are as follows (shown in FIG. 6):

B1: B1 has the same motion information as A1 (indicated by arrow 610)
  B0: B0 has the same motion information as B1 (indicated by arrow 620)
  A0: A0 has the same motion information as A1 (indicated by arrow 630)
  B2: B2 has the same motion information as A1 (indicated by arrow 640) or has the same motion information as B1 (indicated by arrow 650). B2 is checked only if any of A1, B1, B0 or A0 is excluded from the Inter or Merge/Skip candidate list.
  I: I has the same motion information as A1 (I is the inter-view candidate) (indicated by arrow 660)

Figure 7:
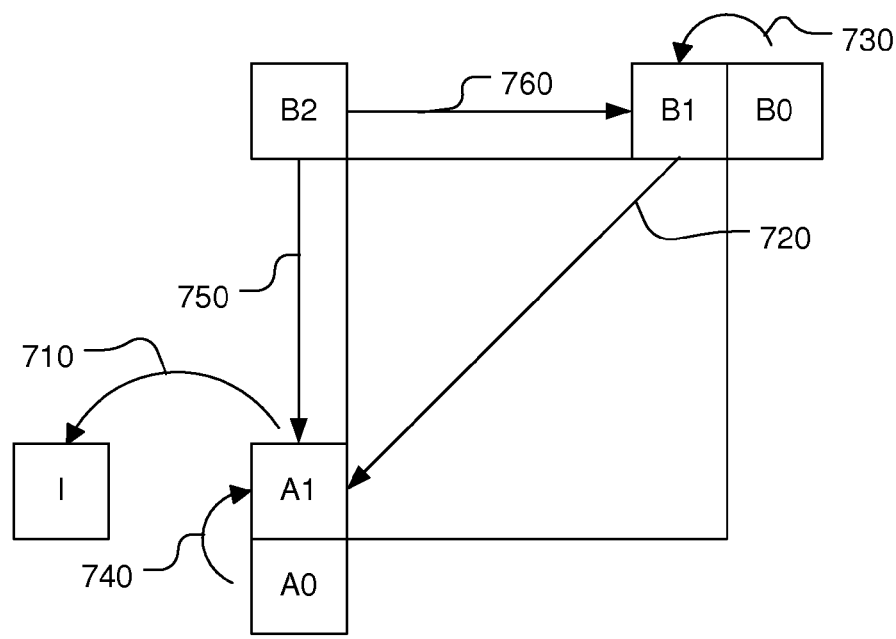

In the third embodiment, the pruning process for Inter, Merge and Skip mode performs a small number of parallel motion information comparisons between candidates from the spatial candidates and the inter-view candidate. The temporal candidate is exempted from the pruning process. The motion information of a spatial or inter-view candidate is inserted into the Merge/Skip candidate list depending of a specific condition on this spatial or inter-view candidate. The pruning process always retains I (i.e., the inter-view candidate) in the Merge/Skip candidate list if motion information (e.g. a motion vector or a disparity vector) is available for I. The conditions for the spatial candidates to be excluded from the Inter or Merge/Skip candidate list are as follows (shown in FIG. 7):

A1: A1 has the same motion information as I (indicated by arrow 710)
  B1: B1 has the same motion information as A1 (indicated by arrow 720)

B0: B0 has the same motion information as B1 (indicated by arrow 730)

A0: A0 has the same motion information as A1 (indicated by arrow 740)

B2: B2 has the same motion information as A1 (indicated by arrow 750) or has the same motion information as B1 (indicated by arrow 760). B2 is checked only if any of A1, B1, B0 or A0 is excluded from the Inter or Merge/Skip candidate list.

Figure 8:
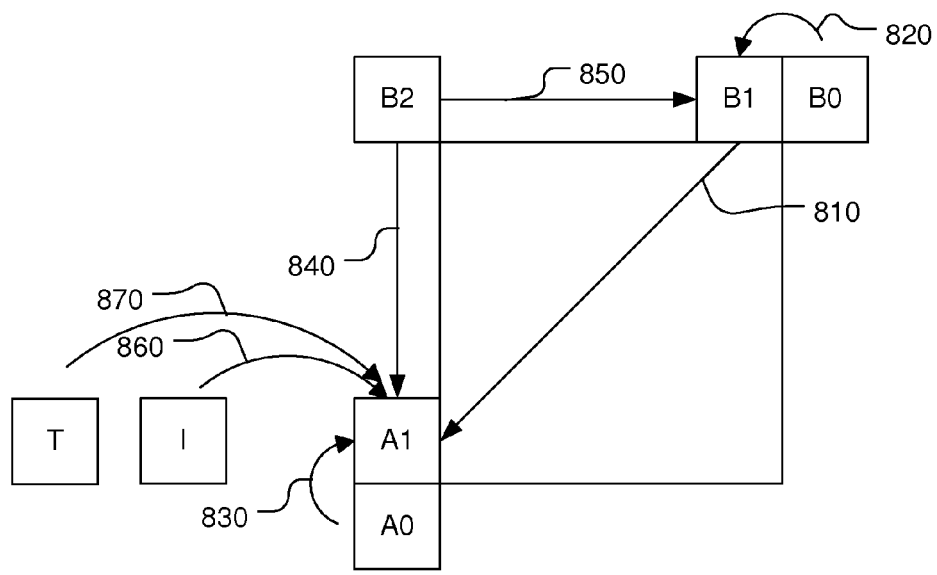

In the fourth embodiment, the pruning process for Inter, Merge and Skip mode performs a small number of parallel motion information comparisons between candidates from the spatial, temporal and the inter-view candidates. The motion information of a spatial, temporal or inter-view candidate is inserted into the Inter or Merge/Skip candidate list depending of a specific condition on this spatial, temporal or inter-view candidate. The pruning process always retains A1 in the list if motion information (e.g. a motion vector or a disparity vector) is available for A1. The conditions for the spatial, temporal and inter-view candidates to be excluded from the Inter or Merge/Skip candidate list are as follows (shown in FIG. 8):

B1: B1 has the same motion information as A1 (indicated by arrow 810)

B0: B0 has the same motion information as B1 (indicated by arrow 820)

A0: A0 has the same motion information as A1 (indicated by arrow 830)

B2: B2 has the same motion information as A1 (indicated by arrow 840) or has the same motion information as B1 (indicated by arrow 850). B2 is checked only if any of A1, B1, B0 or A0 is excluded from the Inter or Merge/Skip candidate list.

I: I has the same motion information as A1 (indicated by arrow 860)

T: T has the same motion information as A1 (T is the temporal candidate) (indicated by arrow 870)

Figure 9:
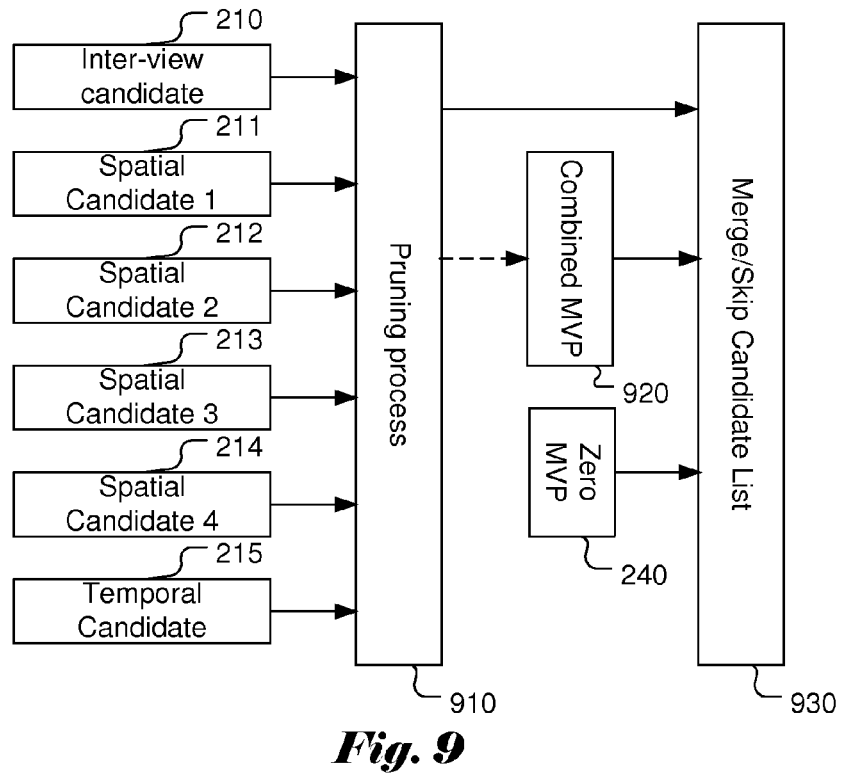
FIG. 9 illustrates an exemplary derivation process on the spatial, temporal and inter-view candidates for Merge/Skip candidate list according to an embodiment of the present invention.
Figure 10:
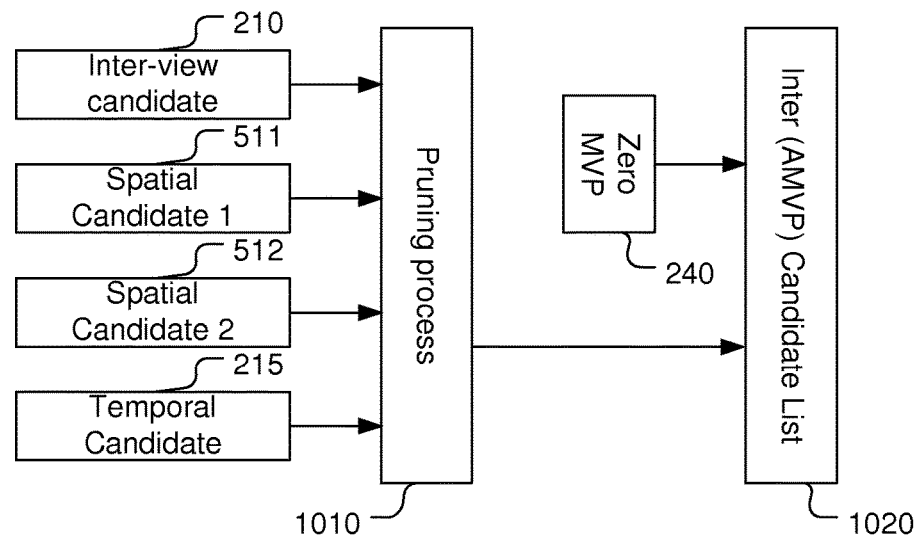
FIG. 10 illustrates an exemplary derivation process on the spatial, temporal and inter-view candidates for Inter (AMVP) candidate list according to an embodiment of the present invention.

In the fifth embodiment, the pruning process is applied to the spatial, temporal and inter-view candidates for Inter, Merge and Skip mode. FIG. 9 illustrates an exemplary Merge/Skip candidate derivation process for Merge/Skip mode, where inter-view candidate 210, spatial candidates 1-4 (211-214) and temporal candidate 215 are provided to pruning process 910. The retained candidates from pruning process 910 are included in Merge/Skip candidate list 930. If the number of candidates is less than a threshold (e.g., 3), a zero MVP (240) can be included in Merge/Skip candidate list 930. If the number of candidates in the Merge/Skip candidate list is below a threshold (e.g., 5), one or more combined MVP can be included using combined MVP 920. The combined MVP process (920) generates one or more bi-predictive Merge/Skip candidates based on retained candidates from pruning process 910. FIG. 10 shows an exemplary Inter (AMVP) candidate derivation process for Inter mode, where pruning process 1010 is applied to inter-view candidate 210, first spatial candidate 511, second spatial candidate 512 and temporal candidate 215. One or more retained candidates from pruning process 1010 are then included in Inter (AMVP) candidate list 1020. Again, if the number of the candidates is below a threshold (e.g., 3), a zero MVP (240) is included in Inter (AMVP) candidate list 1020.

In the sixth embodiment, the pruning process for Inter (AMVP) mode performs only one comparison between two spatial candidates. The temporal candidate and the inter-view candidates are exempted from the pruning process. For example, the second spatial candidate is inserted into the candidate set only when it is different from the first spatial candidate. The two spatial candidates for Inter mode in HTM 3.1 correspond to A1 block next to the left-bottom side of the current block and B1 block next to the top-right side of the current block. However, the two spatial candidates for Inter mode according to the present invention may be associated with spatial neighboring blocks other than A1 and B1.

In the seventh embodiment, the pruning process for Inter (AMVP) mode performs a small number of parallel motion information comparisons between candidates from the spatial and inter-view candidates. The temporal candidate is exempted from the pruning process. The motion information of a spatial or inter-view candidate is inserted into the candidate set depending on a specific condition on this spatial or inter-view candidate. The first spatial candidate is always inserted into the Inter (AMVP) candidate list as long as it is available. The conditions for the spatial and inter-view candidates to be excluded from the Inter (AMVP) candidate list are as follows.

Second spatial candidate: the second spatial candidate has the same motion information as the first spatial candidate.

Inter-view candidate: the inter-view candidate has the same motion information as the first spatial candidate.

In the eighth embodiment, the pruning process for Inter (AMVP) mode performs a small number of parallel motion information comparisons between candidates from the spatial and inter-view candidates. The temporal candidate is exempted from the pruning process. The motion information of a spatial or inter-view candidate is inserted into the candidate set depending on a specific condition of this spatial or inter-view candidate. The inter-view candidate is always inserted into the Inter (AMVP) candidate list as long as it is available. The conditions for the spatial candidates to be excluded from the Inter (AMVP) candidate list are as follows.

First spatial candidate: the first spatial candidate has the same motion information as the inter-view candidate Second spatial candidate: the second spatial candidate has the same motion information as the first spatial candidate.

In the ninth embodiment, the pruning process for Inter (AMVP) mode performs a small number of parallel motion information comparisons between candidates from the spatial, temporal and inter-view candidates. The motion information of a spatial, temporal or inter-view candidate is inserted into the candidate set depending on a specific condition of this spatial, temporal or inter-view candidate. The first spatial candidate is always inserted into the Inter (AMVP) candidate list as long as it is available. The conditions for the spatial, temporal and inter-view candidates to be excluded from the Inter (AMVP) candidate list are as follows.

Second spatial candidate: the second spatial candidate has the same motion information as the first spatial candidate Inter-view candidate: the inter-view candidate has the same motion information as the first spatial candidate.

Temporal candidate: the temporal candidate has the same motion information as the first spatial candidate.

Figure 11:
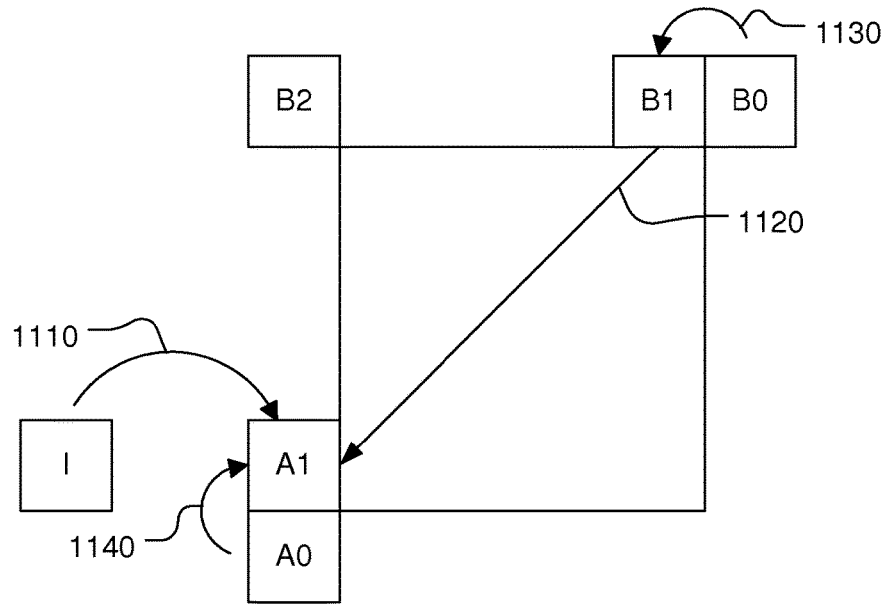
FIG. 11-FIG. 17 illustrates examples of derivation process for Inter or Merge/Skip candidate list according to an embodiment of the present invention.

In the tenth embodiment, the pruning process for Inter, Merge and Skip mode performs a small number of parallel motion information comparisons between candidates from the spatial candidates and the inter-view candidate. The temporal candidate is exempted from the pruning process. The motion information of a spatial or inter-view candidate is inserted into the Inter or Merge/Skip candidate list depending of a specific condition on this spatial or inter-view candidate. The pruning process always retains spatial candidate A1 in the list if motion information (e.g. a motion vector or a disparity vector) is available for A1. The conditions for the spatial and inter-view candidates to be excluded from the Inter or Merge/Skip candidate list are as follows (shown in FIG. 11):

I: I has the same motion information as A1 (indicated by arrow 1110)
B1: B1 has the same motion information as A1 (indicated by arrow 1120)
B0: B0 has the same motion information as B1 (indicated by arrow 1130)
A0: A0 has the same motion information as A1 (indicated by arrow 1140)

In the above case, B2 is included in the Inter or Merge/Skip candidate list if B2 is available. For example, B2 has motion information or is not Intra coded block. B2 is checked only if any of A1, B1, B0 or A0 is excluded from the Inter or Merge/Skip candidate list.

Figure 12:
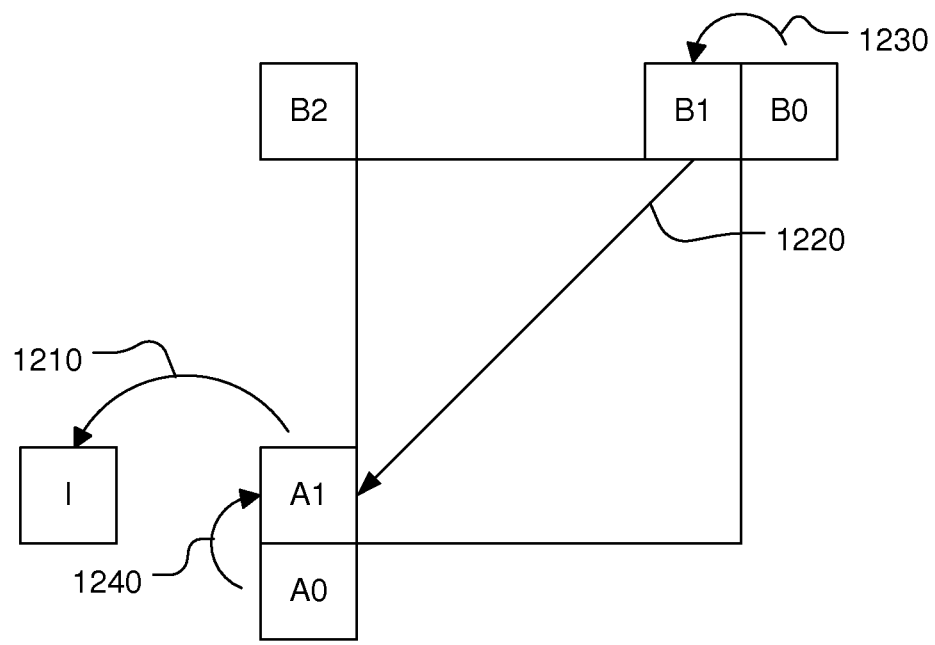

In the eleventh embodiment, the pruning process for Inter, Merge and Skip mode performs a small number of parallel motion information comparisons between candidates from the spatial candidates and the inter-view candidate. The temporal candidate is exempted from the pruning process. The motion information of a spatial or inter-view candidate is inserted into the Inter or Merge/Skip candidate list depending of a specific condition on this spatial or inter-view candidate. The pruning process always retains I (i.e., the inter-view candidate) in the Inter or Merge/Skip candidate list if a motion vector is available for I. The conditions for the spatial candidates to be excluded from the Inter or Merge/Skip candidate list are as follows (shown in FIG. 12):

A1: A1 has the same motion information as I (indicated by arrow 1210)
B1: B1 has the same motion information as A1 (indicated by arrow 1220)
B0: B0 has the same motion information as B1 (indicated by arrow 1230)
A0: A0 has the same motion information as A1 (indicated by arrow 1240)

In the above case, B2 is included in the Inter or Merge/Skip candidate list if B2 is available. For example, B2 has motion information or is not Intra coded block. B2 is checked only if any of A1, B1, B0 or A0 is excluded from the Inter or Merge/Skip candidate list.

Figure 13:
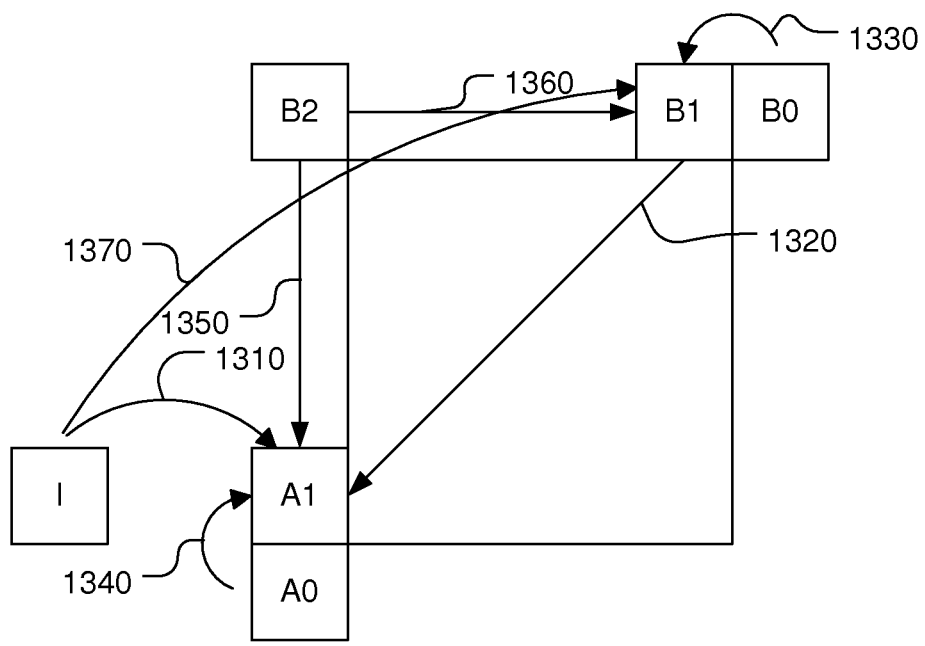

In the twelfth embodiment, the pruning process for Inter, Merge and Skip mode performs a small number of parallel motion information comparisons between candidates from the spatial candidates and the inter-view candidate. The temporal candidate is exempted from the pruning process. The motion information of a spatial or inter-view candidate is inserted into the Inter or Merge/Skip candidate list depending of a specific condition on this spatial or inter-view candidate. The pruning process always retains A1 in the Inter or Merge/Skip candidate list if motion information (e.g. a motion vector or a disparity vector) is available for A1. The conditions for the spatial and inter-view candidates to be excluded from the Merge/Skip candidate list are as follows (shown in FIG. 13):

I: I has the same motion information as A1 (indicated by arrow 1310) or has the same motion information as B1 (indicated by arrow 1370)
B1: B1 has the same motion information as A1 (indicated by arrow 1320)
B0: B0 has the same motion information as B1 (indicated by arrow 1330)
A0: A0 has the same motion information as A1 (indicated by arrow 1340)
B2: B2 has the same motion information as A1 (indicated by arrow 1350) or has the same motion information as B1 (indicated by arrow 1360). B2 is checked only if any of A1, B1, B0 or A0 is excluded from the Inter or Merge/Skip candidate list.

Figure 14:
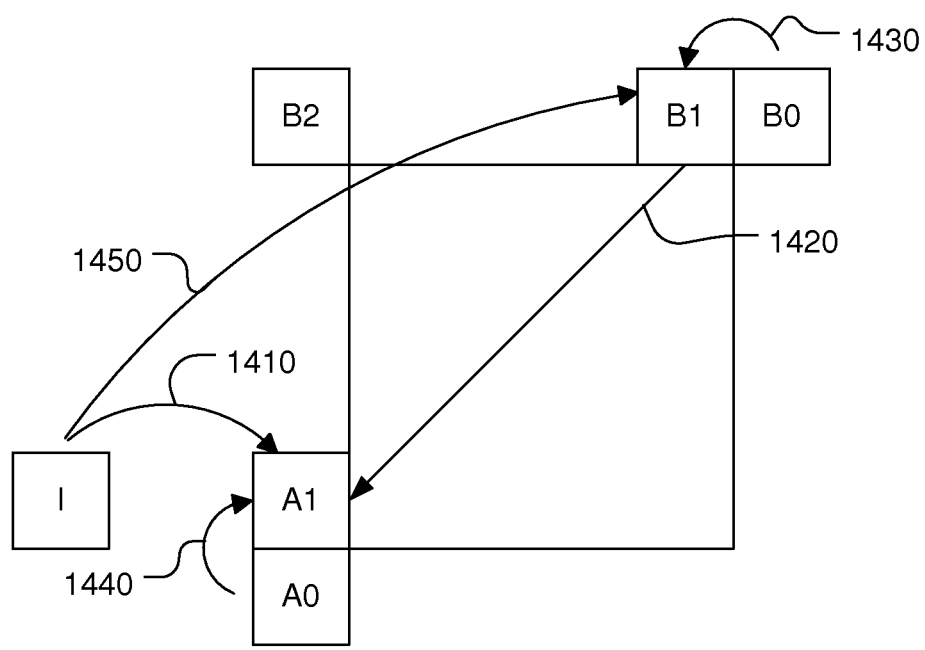

In the thirteenth embodiment, the pruning process for Inter, Merge and Skip mode performs a small number of parallel motion information comparisons between candidates from the spatial candidates and the inter-view candidate. The temporal candidate is exempted from the pruning process. The motion information of a spatial or inter-view candidate is inserted into the Merge/Skip candidate list depending of a specific condition on this spatial or inter-view candidate. The pruning process always retains A1 in the Inter or Merge/Skip candidate list if a motion vector is available for A1. The conditions for the spatial and inter-view candidates to be excluded from the Inter or Merge/Skip candidate list are as follows (shown in FIG. 14):

I: I has the same motion information as A1 (indicated by arrow 1410) or has the same motion information as B1 (indicated by arrow 1450)
B1: B1 has the same motion information as A1 (indicated by arrow 1420)
B0: B0 has the same motion information as B1 (indicated by arrow 1430)
A0: A0 has the same motion information as A1 (indicated by arrow 1440)

In the above case, B2 is included in the Inter or Merge/Skip candidate list if B2 is available. For example, B2 has motion information or is not Intra coded block. B2 is checked only if any of A1, B1, B0 or A0 is excluded from the Inter or Merge/Skip candidate list.

Figure 15:
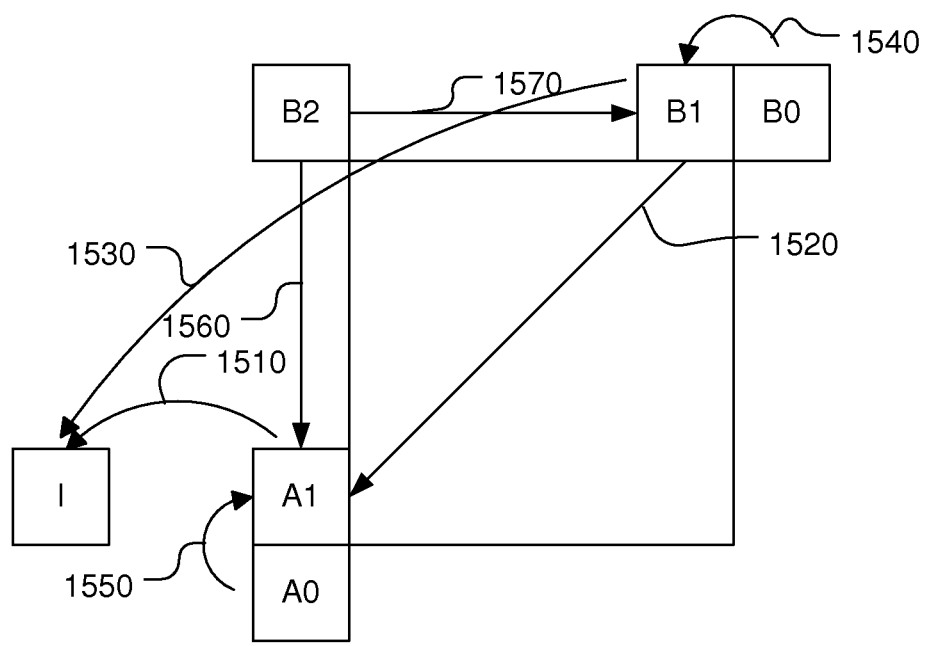

In the fourteenth embodiment, the pruning process for Inter, Merge and Skip mode performs a small number of parallel motion information comparisons between candidates from the spatial candidates and the inter-view candidate. The temporal candidate is exempted from the pruning process. The motion information of a spatial or inter-view candidate is inserted into the Inter or Merge/Skip candidate list depending of a specific condition on this spatial or inter-view candidate. The pruning process always retains I (i.e., the inter-view candidate) in the Inter or Merge/Skip candidate list if a motion vector is available for I. The conditions for these spatial candidates to be excluded from the Inter or Merge/Skip candidate list are as follows (shown in FIG. 15):

A1: A1 has the same motion information as I (indicated by arrow 1510)
B1: B1 has the same motion information as A1 (indicated by arrow 1520) or has the same motion information as I indicated by arrow 1530)
B0: B0 has the same motion information as B1 (indicated by arrow 1540)
A0: A0 has the same motion information as A1 (indicated by arrow 1550)
B2: B2 has the same motion information as A1 (indicated by arrow 1560) or has the same motion information as B1 (indicated by arrow 1570). B2 is checked only if any of A1, B1, B0 or A0 is excluded from the Inter or Merge/Skip candidate list.

Figure 16:
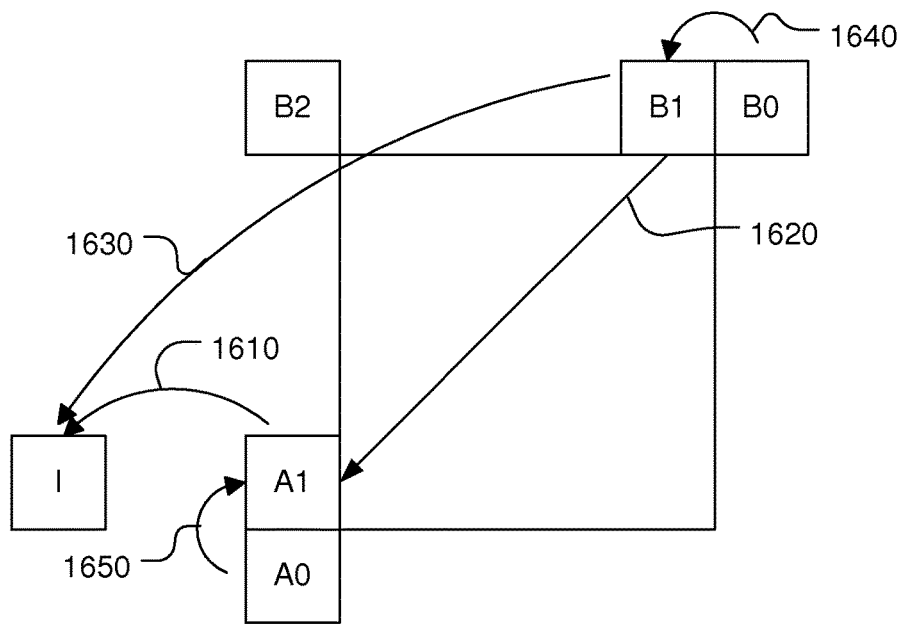

In the fifteenth embodiment, the pruning process for Inter, Merge and Skip mode performs a small number of parallel motion information comparisons between candidates from the spatial candidates and the inter-view candidate. The temporal candidate is exempted from the pruning process. The motion information of a spatial or inter-view candidate is inserted into the Inter or Merge/Skip candidate list depending of a specific condition on this spatial or inter-view candidate. The pruning process always retains I (i.e., the inter-view candidate) in the Merge/Skip candidate list if motion information (e.g. a motion vector or a disparity vector) is available for I. The conditions for the spatial candidates to be excluded from the Merge/Skip candidate list are as follows (shown in FIG. 16):

A1: A1 has the same motion information as I (indicated by arrow 1610)

B1: B1 has the same motion information as A1 (indicated by arrow 1620) or has the same motion information as I indicated by arrow 1630)

B0: B0 has the same motion information as B1 (indicated by arrow 1640)

A0: A0 has the same motion information as A1 (indicated by arrow 1650)

In the above case, B2 is included in the Inter or Merge/Skip candidate list if B2 is available. For example, B2 has motion information or is not Intra coded block. B2 is checked only if any of A1, B1, B0 or A0 is excluded from the Inter or Merge/Skip candidate list.

Figure 17:
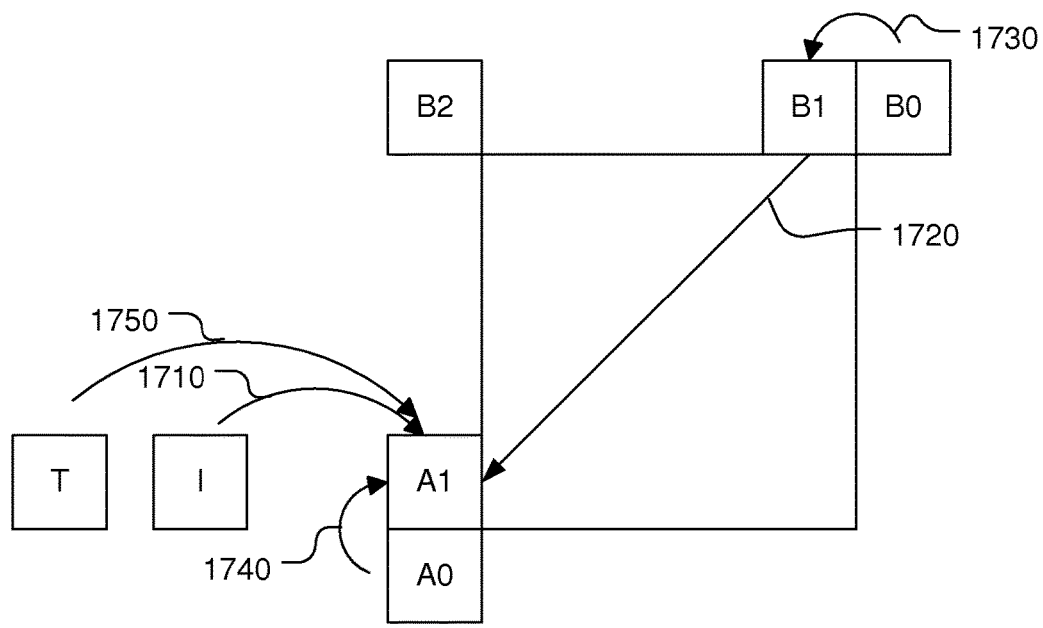

In the sixteenth embodiment, the pruning process for Inter, Merge and Skip mode performs a small number of parallel motion information comparisons between candidates from the spatial, temporal and the inter-view candidates. The motion information of a spatial, temporal or inter-view candidate is inserted into the Inter or Merge/Skip candidate list depending of a specific condition on this spatial, temporal or inter-view candidate. The pruning process always retains A1 in the list if a motion vector is available for A1. The conditions for these spatial candidates to be excluded from the Inter or Merge/Skip candidate list are as follows (shown in FIG. 17):

I: I has the same motion information as A1 (I is the inter-view candidate) (indicated by arrow 1710)

B1: B1 has the same motion information as A1 (indicated by arrow 1720)

B0: B0 has the same motion information as B1 (indicated by arrow 1730)

A0: A0 has the same motion information as A1 (indicated by arrow 1740)

T: T has the same motion information as A1 (indicated by arrow 1750)

In the above case, B2 is included in the Inter or Merge/Skip candidate list if B2 is available. For example, B2 has motion information or is not Intra coded block. B2 is checked only if any of A1, B1, B0 or A0 is excluded from the Inter or Merge/Skip candidate list.

In the seventeenth embodiment, the pruning process for Merge and Skip mode only performs a small number of parallel motion information comparisons between candidates from the spatial, temporal and inter-view candidates. The inter-view, temporal, or both the inter-view and temporal candidates are compared to the first available spatial candidate.

In the eighteenth embodiment, the pruning process for Inter mode (AMVP) performs a small number of parallel motion information comparisons between candidates from the spatial and inter-view candidates. The temporal candidate is exempted from the pruning process. The motion information of a spatial or inter-view candidate is inserted into the candidate set depending on a specific condition of this spatial or inter-view candidate. The inter-view candidate is always inserted into the Inter (AMVP) candidate list as long as it is available. The conditions for the spatial candidates to be excluded from the AMVP candidate list are as follows.

First spatial candidate: the first spatial candidate has the same motion information as the inter-view candidate Second spatial candidate: the second spatial candidate has the same motion information as inter-view candidate.

In the above embodiment, instead of the temporal candidate, the inter-view candidate can be exempted from the pruning process. The temporal candidate is always inserted into the Inter (AMVP) candidate list as long as it is available. Also, instead of being compared with inter-view candidate, the first and second spatial candidates are compared with the temporal candidate.

Furthermore, in the above embodiments, A1 block is selected when a spatial candidate is always included in the candidate list. Other neighboring blocks may also be selected. For example, instead of A1 block, B1 block can be selected when a spatial candidate is always included in the candidate list.

Figure 18:
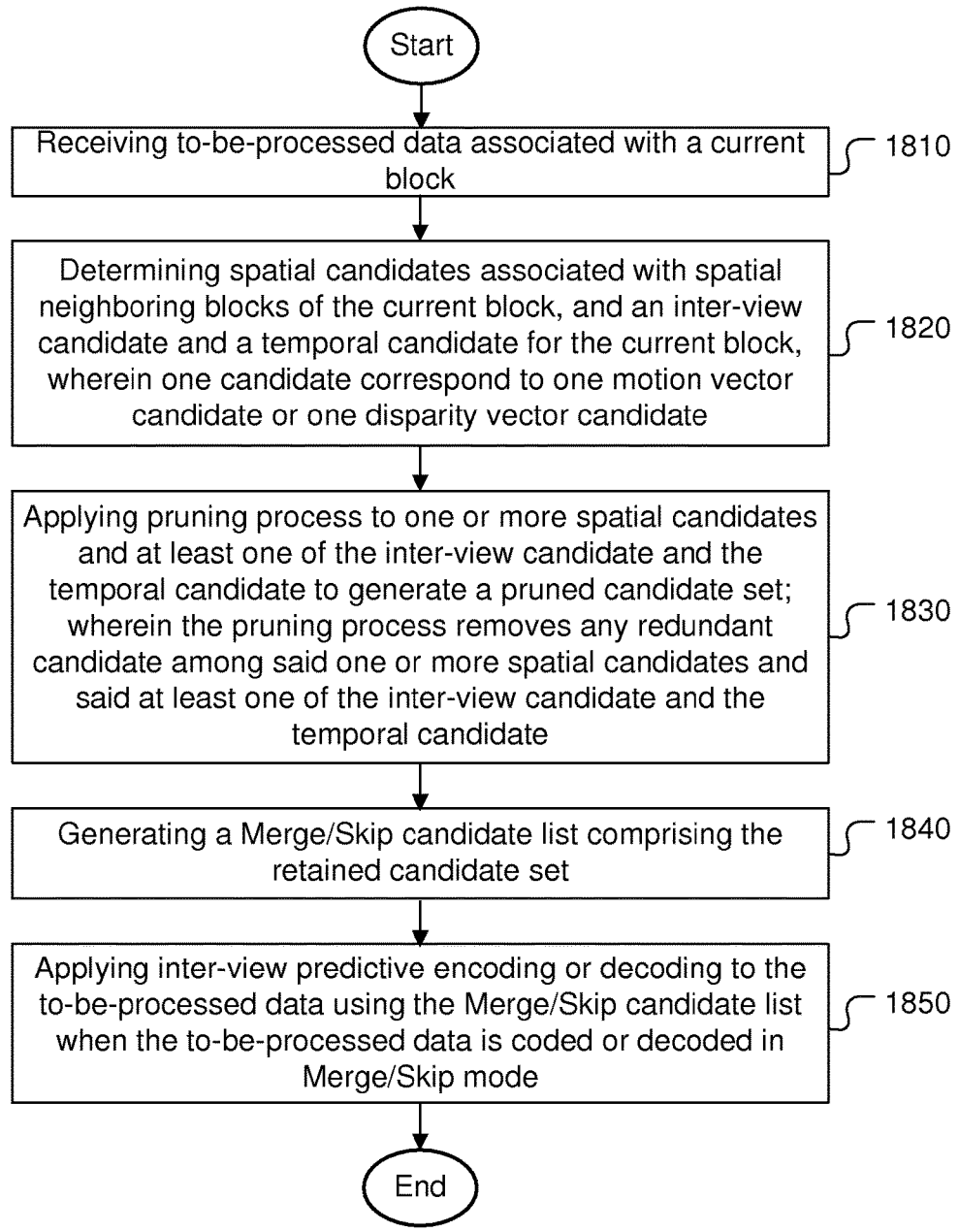
FIG. 18 illustrates a flowchart for a three-dimensional coding system incorporating pruning process according to an embodiment of the present invention.

FIG. 18 illustrates an exemplary flowchart of a three-dimensional encoding or decoding system incorporating the pruning process according to an embodiment of the present invention. The system receives to-be-processed data associated with the current texture block as shown in step 1810. For encoding, the to-be-processed data associated with the current texture block corresponds to original pixel data, depth data, or other information associated with the current block (e.g., motion vector, disparity vector, motion vector difference, or disparity vector difference) to be coded. The to-be-processed data may also correspond to residue pixel data to be inter-view predicted. In the latter case, the residue pixel data is further predicted using inter-view prediction to generate another residue data of the residue pixel data. For decoding, the to-be-processed data corresponds to the residue data (residual pixel data or depth data) or inter-view residue data of another residual data to be used to reconstruct the pixel data or depth data, or other compressed or coded information (e.g., motion vector, disparity vector, motion vector difference, or disparity vector difference) associated with the current block. The to-be-processed data may be retrieved from storage such as a computer memory, buffer (RAM or DRAM) or other media. The to-be-processed data may also be received from a processor such as a controller, a central processing unit, a digital signal processor or electronic circuits that produce the to-be-processed data. The spatial candidates associated with spatial neighboring blocks of the current block, and an inter-view candidate and a temporal candidate for the current block are determined in step 1820, wherein the candidate corresponds to a motion vector candidate or a disparity vector candidate. The pruning process is then applied to one or more spatial candidates and at least one of the inter-view candidate and the temporal candidate to generate a retained candidate set as shown in step 1830; wherein the pruning process removes any redundant candidate among said one or more spatial candidates and said at least one of the inter-view candidate and the temporal candidate. A Merge/Skip candidate list is generated in step 1840, wherein the candidate list comprises the retained candidate set. Inter-view predictive coding is then applied to the to-be-processed data using the Merge/Skip candidate list in step 1850 to-be-processed data when the to-be-processed data is coded or decoded in Merge/Skip mode.

Figure 19:
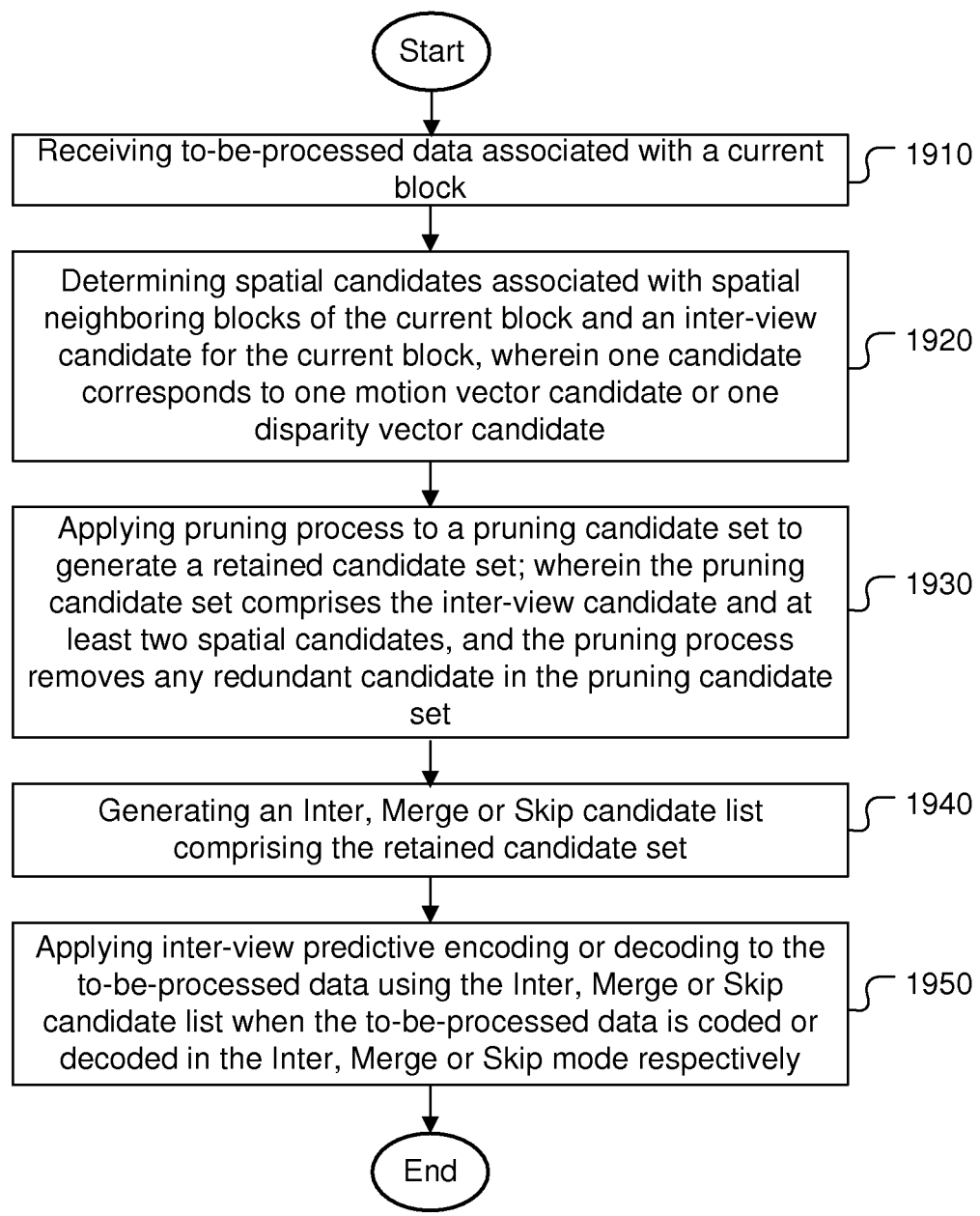
FIG. 19 illustrates a flowchart for another three-dimensional coding system incorporating pruning process according to an embodiment of the present invention.

FIG. 19 illustrates an exemplary flowchart of another three-dimensional encoding or decoding system incorporating the pruning process according to an embodiment of the present invention. The system receives to-be-processed data associated with the current texture block as shown in step 1910. The spatial candidates associated with spatial neighboring blocks of the current block and an inter-view candidate for the current block are determined in step 1920, wherein the candidate corresponds to a motion vector candidate or a disparity vector candidate. The pruning process is then applied to a pruning candidate set to generate a retained candidate set as shown in step 1930; wherein the pruning candidate set comprises the inter-view candidate and at least two spatial candidates, and the pruning process removes any redundant candidate in the pruning candidate set. An Inter, Merge or Skip candidate list comprising the retained candidate set is generated in step 1940. Inter-view predictive encoding or decoding is then applied to the to-be-processed data using the Inter, Merge or Skip candidate list when the to-be-processed data is coded or decoded in the Inter, Merge or Skip mode respectively in step 1950.

The flowcharts shown above are intended to illustrate examples of pruning process based on one or more spatial candidates and at least one of the inter-view candidate and the temporal candidate to generate a retained candidate set according to an embodiment of the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for a three-dimensional video encoding or decoding system, the method comprising:
    receiving to-be-processed data associated with a current block of a first view of multi-view video data;
    determining spatial candidate vectors of spatial neighboring blocks of the current block, and an inter-view candidate vector of a block of a second view of the multi-view video data corresponding to the current block and a temporal candidate vector of a temporal candidate block of the current block, wherein each one of the spatial candidate vectors, the inter-view candidate vector, and the temporal candidate vector includes at least one motion vector or at least one disparity vector;
    applying a pruning process to one or more of the spatial candidate vectors and the inter-view candidate vector to generate a retained candidate set, wherein the pruning process removes any redundant candidate vectors among the one or more spatial candidate vectors and the inter-view candidate vector;
    generating a Merge or Skip candidate list including candidate vectors in the retained candidate set; and
    applying predictive encoding or decoding to the to-be-processed data of the first view of the multi-view video data using the Merge or Skip candidate list when the to-be-processed data is coded or decoded in Merge or Skip mode,
    wherein the one or more spatial candidate vectors and the inter-view candidate vector are processed by the pruning process, and the temporal candidate vector is exempted from the pruning process,
    wherein the pruning process includes comparing the spatial candidate vectors of the spatial neighboring blocks of the current block to the inter-view candidate vector, the spatial neighboring blocks being respectively located left of the bottom-left side of the current block, a corresponding candidate vector being referred to as A1 candidate, and above the top-right side of the current block, a corresponding candidate vector being referred to as B1 candidate,
    wherein the inter-view candidate vector is not a part of the spatial neighboring blocks of the current block, and
    wherein the A1 candidate is pruned from the candidate list if the A1 candidate has same motion information as the inter-view candidate vector, or the B1 candidate is pruned from the candidate list if the B1 candidate has same motion information as the inter-view candidate vector.

2. The method of claim 1, wherein the inter-view candidate vector is pruned from the candidate list if the inter-view candidate vector has same motion information as first available candidate of said one or more spatial candidate vectors in the pruning process.

3. The method of claim 1, wherein the temporal candidate vector is pruned from the candidate list if the temporal candidate vector has same motion information as one of said one or more spatial candidate vectors in the pruning process.

4. The method of claim 1, wherein the inter-view candidate vector is always retained in the retained candidate set.

5. An apparatus for a three-dimensional video encoding or decoding system, the apparatus comprising:
  circuitry configured to:
    receive to-be-processed data associated with a current block of a first view of multi-view video data;
    determine spatial candidate vectors of spatial neighboring blocks of the current block, and an inter-view candidate vector of a block of a second view of the multi-view video data corresponding to the current block and a temporal candidate vector of a temporal candidate block of the current block, wherein each one of the spatial candidate vectors, the inter-view candidate vector, and the temporal candidate vector includes at least one motion vector or at least one disparity vector;
    apply a pruning process to one or more of the spatial candidate vectors and the the inter-view candidate vector to generate a retained candidate set, wherein the pruning process removes any redundant candidate vectors among the one or more spatial candidate vectors and the inter-view candidate vector;
    generate a Merge or Skip candidate list including candidate vectors in the retained candidate set; and
    apply predictive encoding or decoding to the to-be-processed data of the first view of the multi-view video data using the Merge or Skip candidate list when the to-be-processed data is coded or decoded in Merge or Skip mode,
  wherein the one or more spatial candidate vectors and the inter-view candidate vector are processed by the pruning process, and the temporal candidate vector is exempted from the pruning process,
  wherein the pruning process includes comparing the spatial candidate vectors of the spatial neighboring blocks of the current block to the inter-view candidate vector, the spatial neighboring blocks being respectively located left of the bottom-left side of the current block, a corresponding candidate vector being referred to as A1 candidate, and above the top-right side of the current block, a corresponding candidate vector being referred to as B1 candidate,
  wherein the inter-view candidate vector is not a part of the spatial neighboring blocks of the current block, and
  wherein the A1 candidate is pruned from the candidate list if the A1 candidate has same motion information as the inter-view candidate vector, or the B1 candidate is pruned from the candidate list if the B1 candidate has same motion information as the inter-view candidate vector.

* * * * *